(12) United States Patent
Tanimoto et al.

(10) Patent No.: US 11,124,242 B2
(45) Date of Patent: Sep. 21, 2021

(54) FRONT END BODY STRUCTURE AND VEHICLE

(71) Applicant: MITSUBISHI HEAVY INDUSTRIES, LTD., Tokyo (JP)

(72) Inventors: Koshi Tanimoto, Tokyo (JP); Ryoji Okabe, Tokyo (JP); Kouji Esaki, Tokyo (JP)

(73) Assignee: MITSUBISHI HEAVY INDUSTRIES, LTD, Tokyo (JP)

( * ) Notice: Subject to any disclaimer, the term of this patent is extended or adjusted under 35 U.S.C. 154(b) by 340 days.

(21) Appl. No.: 16/088,148

(22) PCT Filed: Mar. 15, 2017

(86) PCT No.: PCT/JP2017/010438
§ 371 (c)(1),
(2) Date: Sep. 25, 2018

(87) PCT Pub. No.: WO2017/169790
PCT Pub. Date: Oct. 5, 2017

(65) Prior Publication Data
US 2020/0298913 A1    Sep. 24, 2020

(30) Foreign Application Priority Data

Mar. 30, 2016    (JP) .............................. JP2016-069191

(51) Int. Cl.
*B62D 25/08* (2006.01)
*B62D 29/04* (2006.01)
(52) U.S. Cl.
CPC ........... *B62D 25/08* (2013.01); *B62D 29/043* (2013.01)

(58) Field of Classification Search
CPC ........ B62D 25/02; B62D 25/04; B62D 25/06; B62D 25/08; B61D 17/005
(Continued)

(56) References Cited

U.S. PATENT DOCUMENTS 4,917,435 A * 4/1990 Bonnett ................. B62D 29/00
296/190.08
5,042,395 A * 8/1991 Wackerle ............. B61D 17/045
105/397

(Continued)

FOREIGN PATENT DOCUMENTS

EP    0888946    * 1/1999 ............. B61D 17/06
JP    8-39559       2/1996
(Continued)

*Primary Examiner* — D Glenn Dayoan
*Assistant Examiner* — Kevin P Weldon
(74) *Attorney, Agent, or Firm* — Wenderoth, Lind & Ponack, L.L.P.

(57) ABSTRACT

A front end body structure (3) has a front wall portion (4) which forms a front surface (4b) in a front-rear direction (Da) and has edge portions which form an opening portion (4a) opened; and a ceiling wall portion (5) which is continuous with the front wall portion (4) and forms a ceiling surface (5a) facing an upper side. In t front wall portion (4), side edge portions (41, 42) on both sides in the width direction (Dw) and an upper edge portion (40) on the upper side among edge portions surrounding the opening portion (4a) have a multi-axial fiber-reinforced plastic material in which at least two directions along the outer surface are set as a fiber direction. At least a partial region of the ceiling wall part (5) including a central portion in the width direction (Dw) has a core material sandwiched between the multi-axial fiber-reinforced plastic materials.

14 Claims, 4 Drawing Sheets

(58) Field of Classification Search
USPC .............. 296/901.01, 181.1, 181.2; 105/396, 105/238.1, 456
See application file for complete search history.

(56) References Cited

U.S. PATENT DOCUMENTS

| | | |
|---|---|---|
| 2003/0075952 A1 | 4/2003 | Mochidome et al. |
| 2003/0175455 A1* | 9/2003 | Erb .......................... B32B 1/08 |
| | | 428/36.1 |
| 2010/0140975 A1* | 6/2010 | Cho ..................... B62D 29/043 |
| | | 296/178 |
| 2012/0108122 A1 | 5/2012 | Elia et al. |
| 2014/0221550 A1* | 8/2014 | McEvoy ............ C08G 18/5021 |
| | | 524/500 |
| 2014/0346811 A1* | 11/2014 | Zaluzec .................. B29C 70/30 |
| | | 296/187.12 |
| 2016/0221611 A1* | 8/2016 | Wolf ...................... B62D 25/04 |
| 2016/0318555 A1* | 11/2016 | Bjekovic ............... B62D 25/20 |

FOREIGN PATENT DOCUMENTS

| | | |
|---|---|---|
| JP | 10-273042 | 10/1998 |
| JP | 2000-264199 | 9/2000 |
| JP | 3625779 | 3/2005 |
| JP | 3848820 | 11/2006 |
| JP | 4230759 | 2/2009 |
| JP | 2013-543802 | 12/2013 |
| JP | 2015-47887 | 3/2015 |
| JP | 6616227 | 12/2019 |

\* cited by examiner

FRONT END BODY STRUCTURE AND VEHICLE

TECHNICAL FIELD

The present invention relates to a front end body structure and a vehicle.

Priority is claimed on Japanese Patent Application No. 2016-069191, filed Mar. 30, 2016, the content of which is incorporated herein by reference.

BACKGROUND ART

As a new transportation system which is new transportation means other than buses and railways, a guideway transit system which runs on tracks using running wheels made of rubber tires and the like are known. Such a guideway transit system is generally called a new transportation system or an APM (Automated People Mover).

For vehicles of guideway transit systems, weight reduction and reduction in costs are required. Therefore, in some cases, the vehicle itself may be made of a plastic material such as fiber-reinforced plastic (FRP) rather than a metallic material. For example, in the vehicle described in Patent Document 1, a front head structure (a front end body structure) of a leading vehicle is formed by forming separate blocks using panel type units including a high hardness FRP material and fixing them with bolts.

CITATION LIST

Patent Literature

[Patent Document 1]
Japanese Patent No. 3625779

SUMMARY OF INVENTION

Technical Problem

Incidentally, a load may be applied to the front end body structure from various directions. Specifically, due to a cross wind blowing in a width direction of the vehicle as well as a running wind from the front caused by running of the vehicle, the front end body structure receives a load by which a side surface is distorted. Therefore, it is necessary to ensure strength in response to this load when the front end body structure is formed of a plastic material.

The present invention provides a front end body structure and a vehicle capable of securing strength against a load, while using a plastic material.

Solution to Problem

In order to solve the above problem, the present invention proposes the following means.

A first aspect of the present invention is a front end body structure which forms an end portion in a front-rear direction of a vehicle, the front end body structure including: a front wall portion which forms a front surface facing one side in the front-rear direction and has an edge portion forming an opening portion which opens toward one side in the front-rear direction; and a ceiling wall portion which is continuous with the front wall portion and forms a ceiling surface facing a side above the vehicle in the vertical direction, wherein, in the front wall portion, side edge portions on both sides of the vehicle in the width direction and an upper edge portion on the upper side in the vertical direction among edge portions surrounding the opening portion include a multi-axial fiber-reinforced plastic material in which at least two directions along the outer surface are set as a fiber direction.

According to such a configuration, the multi-axial fiber-reinforced plastic material is used for the side edge portion and the upper edge portion on both sides on which the direction along the outer surface is the vertical direction and the width direction. Therefore, it is possible to form the front wall portion as a frame structure with improved rigidity in the vertical direction and the width direction. Therefore, it is possible to form the front end body structure by securing the function of increasing the rigidity against a load in the width direction in the front wall portion.

Further, in the front end body structure according to a second aspect of the present invention, in the first aspect, the front wall portion may have a multi-axial fiber-reinforced plastic material in which at least two directions obliquely intersecting each other in the width direction and the vertical direction are set as the fiber direction.

Further, in the front end body structure according to a third aspect of the present invention, in the first or second aspect, a connecting portion which connects the front wall portion and the ceiling wall portion may be formed only of the multi-axial fiber-reinforced plastic material.

According to such a configuration, a curved surface is formed at the connecting portion which connects the front wall portion and the ceiling wall portion facing in different directions. In the region in which such a curved surface is formed, hoop stress due to the curved surface is generated. Therefore, a rigidity in response to a load in the vertical direction can be ensured using only the biaxial fiber-reinforced plastic material. Therefore, it is possible to reduce the amount of a core material used, and it is possible to manufacture the front end body structure with reduced costs.

In the front end body structure according to a fourth aspect of the present invention, in any one of the first to third aspects, at least one of the side edge portion and the upper edge portion may have a core material sandwiched between pieces of multi-axial fiber-reinforced plastic material.

According to such a configuration, the bending rigidity of the side edge portion and the upper edge portion against the load from the front side to the rear side due to a running wind can be improved by the core material, respectively, as compared with the case of using only the multi-axial fiber-reinforced plastic material.

In addition, in the front end body structure according to a fifth aspect of the present invention, in any one of the first to fourth aspects, the lower edge portion on the lower side in the vertical direction among the edge portions of the opening portion may have a uniaxial fiber-reinforced plastic material in which the width direction is set as the fiber direction.

With such a configuration, the rigidity of the front wall portion against the load from the front side to the rear side due to the running wind can be improved by the lower edge portion.

In the front end body structure according to a sixth aspect of the present invention, in the fifth aspect, the lower edge portion may have a core material sandwiched between pieces of uniaxial fiber-reinforced plastic.

According to such a configuration, the bending rigidity of the lower edge portion against the load from the front side to the rear side due to running wind can be improved by the core material, as compared with the case of only the uniaxial fiber-reinforced plastic.

Further, in the front end body structure according to a seventh aspect of the present invention, in the sixth aspect, the lower edge portion may have a uniaxial fiber-reinforced plastic sandwiched between the multi-axial fiber-reinforced plastic materials.

According to such a configuration, the rigidity of the front wall portion against a shear stress due to by a cross wind can be improved by the lower edge portion.

Further, in the front end body structure according to an eighth aspect of the present invention, in any one of the first to seventh aspects, at least a part of a region of the ceiling wall portion including a center portion in the width direction may include a piece of core material sandwiched between the multi-axial fiber-reinforced plastic materials.

According to such a configuration, the bending rigidity of the ceiling wall portion against the load in the vertical direction can be improved by the core material. Therefore, it is possible to form the front end body structure by separating the function of improving the rigidity against the load in different directions to the front wall portion and the ceiling wall portion, respectively.

Further, a vehicle according to a ninth aspect of the present invention includes the front end body structure according to any one of the first to eighth aspects, and a vehicle main body fixed to the front end body structure.

With such a configuration, it is possible to reduce the weight, while minimizing the cost of a vehicle while securing the strength.

Advantageous Effects of Invention

According to the present invention, it is possible to ensure strength against a load, while using a plastic material.

DESCRIPTION OF EMBODIMENTS

Hereinafter, a vehicle according to an embodiment of the present invention will be described with reference to FIGS. 1 to 5.

Figure 1:
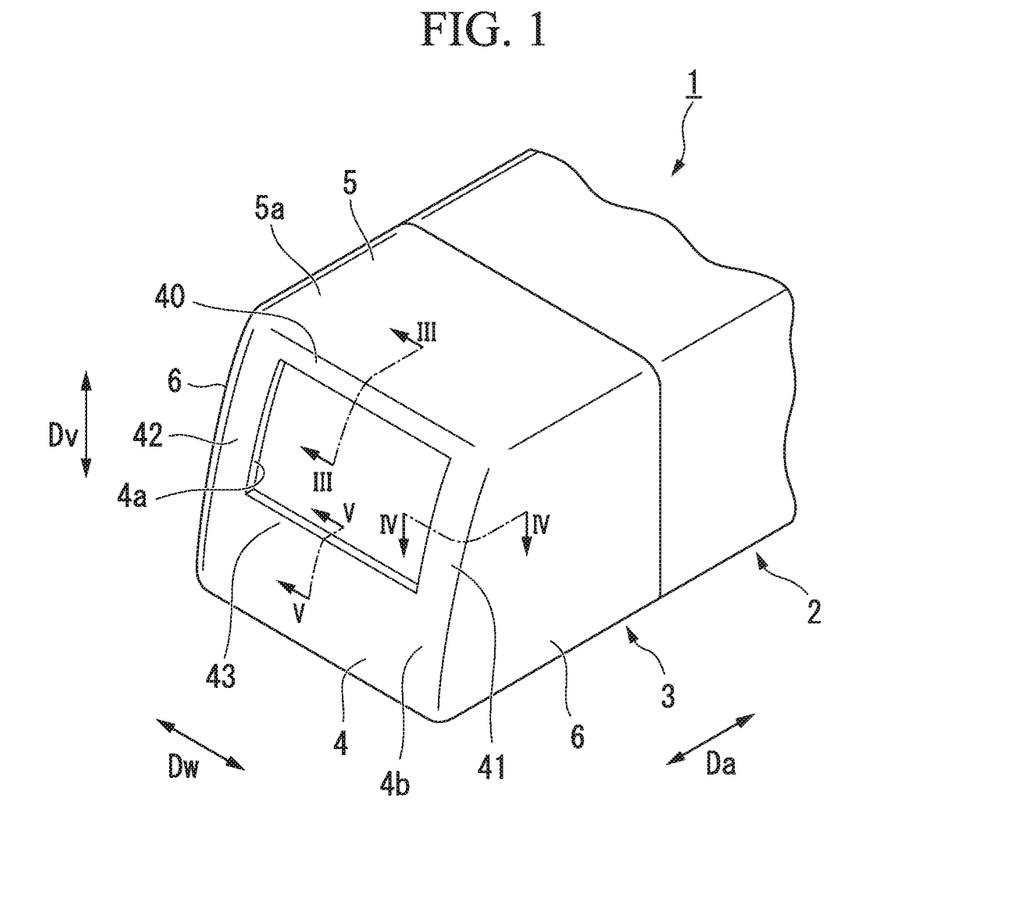
FIG. 1 is a perspective view showing a schematic configuration of a vehicle according to an embodiment of the present invention.

A vehicle 1 of the present invention is a connected vehicle of a guideway transit system which runs on tracks, while being guided by guide rails. The guideway transit system of this embodiment is a side guide rail type (side guide type) transportation system in which guide rails extending along an extending direction of the tracks are provided on both sides in a width direction Dw of the vehicle 1. As shown in FIG. 1, the vehicle 1 of the present embodiment includes a vehicle main body 2 and a front end body structure 3.

Hereinafter, a direction in which the vehicle 1 runs is referred to as the front-rear direction Da. The width direction Dw of the vehicle 1 orthogonal to the front-rear direction Da is simply referred to as the width direction Dw. A direction orthogonal to the front-rear direction Da and the width direction Dw is referred to as a vertical direction Dv.

The vehicle main body 2 has a structure of a box-shape in an external view having a cavity inside. An opening/closing door, a window, and the like (not shown) are provided on the side surface of the vehicle main body 2 facing the width direction Dw. Running wheels (not shown) rolling on the running path of the track, and guide wheels (not shown) for guiding the vehicle 1 in a desired direction along the guide rail are attached to the vehicle main body 2.

The front end body structure 3 constitutes a front end portion which is one side of the vehicle 1 in the front-rear direction Da. The front end body structure 3 is mechanically and integrally fixed to the vehicle main body 2 by bolts and the like. The front end body structure 3 of the present embodiment includes a front wall portion 4, a ceiling wall portion 5, and a sidewall portion 6. The front wall portion 4, the ceiling wall portion 5, and the sidewall portion 6 of the front end body structure 3 are integrally formed.

Figure 2:
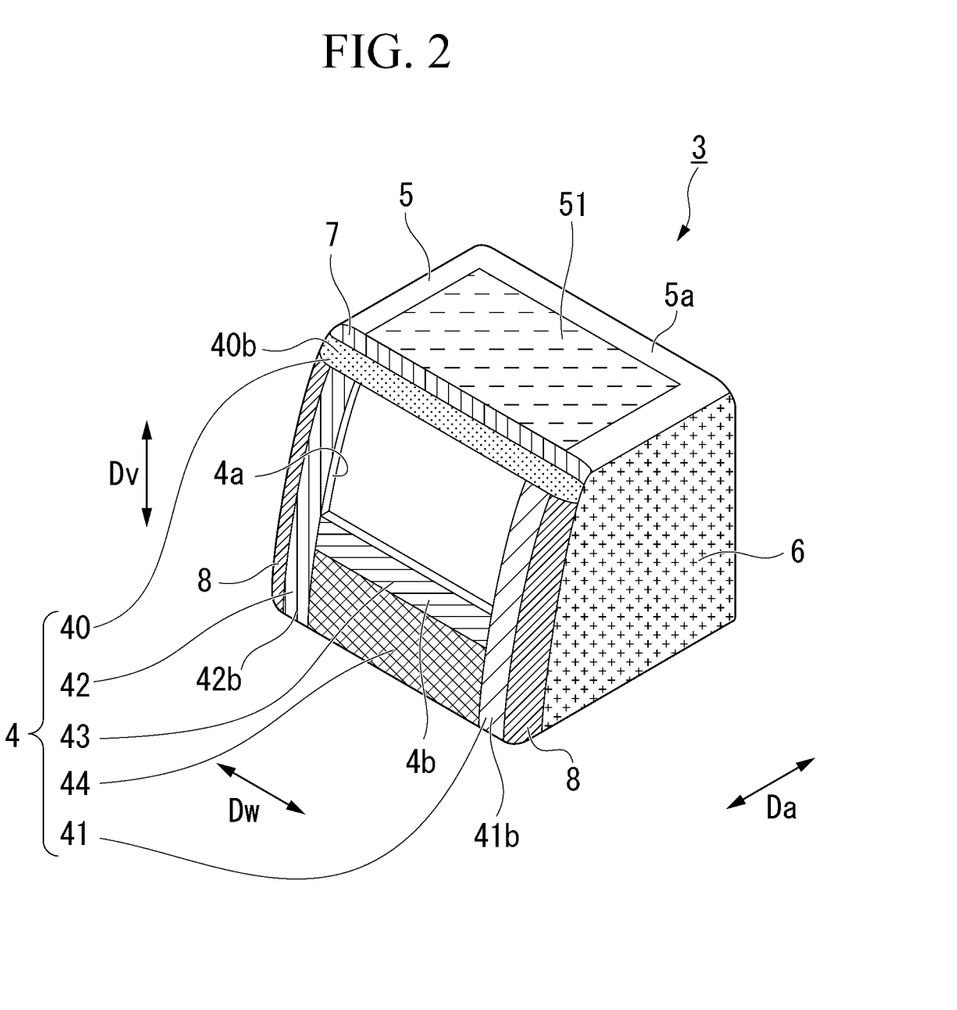
FIG. 2 is a perspective view showing each region of a front end body structure in the embodiment according to the present invention.

The front wall portion 4 forms a front surface 4b which is an outer surface facing the front side in the front-rear direction Da of the front end body structure 3. The front wall portion 4 has an edge portion which forms an opening portion 4a which opens toward the front side. The opening portion 4a forms a front window of the vehicle 1 due to a transparent member of for example glass or reinforced plastic being fitted thereto. The front wall portion 4 in the present embodiment is a region that is visible when the front end body structure 3 is viewed from the front side in the front-rear direction Da. The opening portion 4a is opened in a rectangular shape. As shown in FIG. 2, the front wall portion 4 has an upper edge portion 40, a first side edge portion (a side edge portion) 41, a second side edge portion (a side edge portion) 42 and a lower edge portion 43, as edge portions which surround the opening portion 4a.

Figure 3:
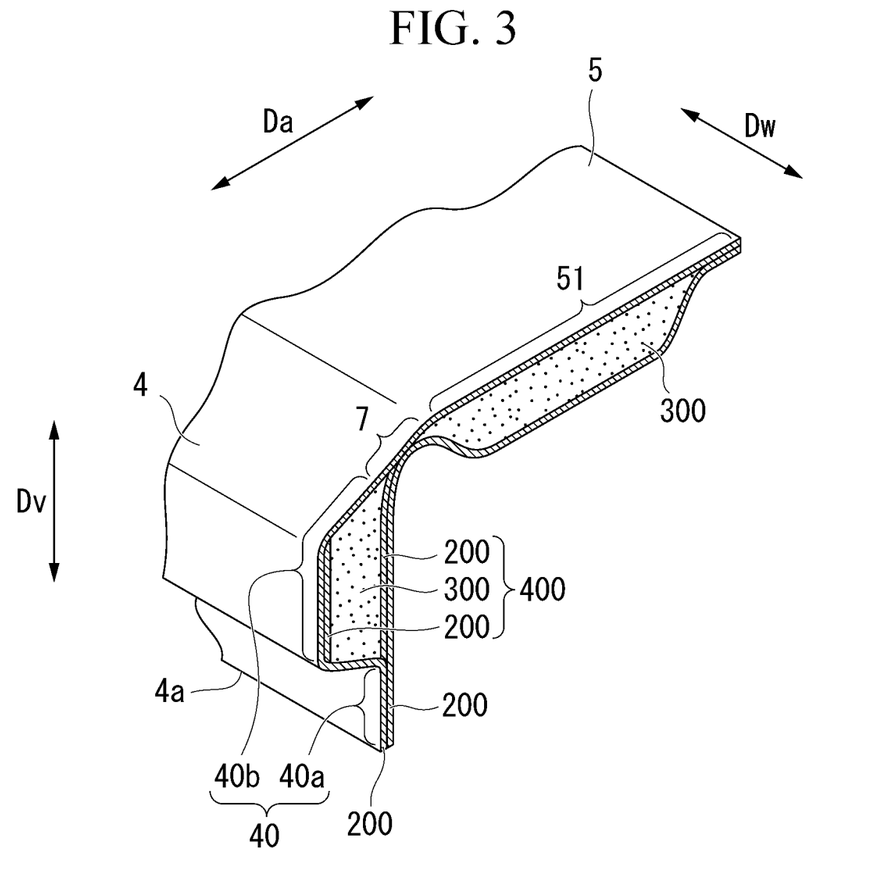
FIG. 3 is a perspective view showing a cross section of an upper edge portion and a ceiling wall portion in the embodiment according to the present invention, taken along a line in FIG. 1.

The upper edge portion 40 is located on the upper side in the vertical direction Dv with respect to the opening portion 4a. The upper edge portion 40 extends in the width direction Dw on the upper side of the opening portion 4a in the front wall portion 4. The upper edge portion 40 has a multi-axial fiber-reinforced plastic material in which at least two directions along the outer surface are set as fiber directions. Here, the two directions along the outer surface of the upper edge portion 40 of the present embodiment are directions including components in the vertical direction Dv along the outer surface, and directions including components in the width direction Dw along the outer surface. As shown in FIG. 3, the upper edge portion 40 has a core material 300 sandwiched between multi-axial fiber-reinforced plastic materials. Here, the core material 300 in the upper edge portion 40 and the multi-axial fiber-reinforced plastic material sandwiching the core material 300 are collectively referred to as the first laminate material 400. The upper edge portion 40 has a first laminate material 400 sandwiched between the multi-axial fiber-reinforced plastic materials.

The multi-axial fiber-reinforced plastic material of the present embodiment is a sheet-like biaxial fiber-reinforced plastic material (biaxial FRP) 200. In the biaxial fiber-reinforced plastic material 200 of this embodiment, the two directions orthogonal to each other along the outer surface are set the fiber directions. Therefore, when the biaxial fiber-reinforced plastic material 200 of the present embodiment is used for the front wall portion 4, a fiber direction inclined at ±45° with respect to each of the vertical direction Dv and the width direction Dw is set as the fiber direction. Further, when the biaxial fiber-reinforced plastic material 200 is used for the ceiling wall portion 5 which will be described later, a direction inclined at ±45° with respect to each of the width direction Dw and the front-rear direction Da is set to the fiber direction. Further, when the biaxial fiber-reinforced plastic material 200 is used for the sidewall portion 6, a direction inclined at ±45° with respect to each of the front-rear direction Da and the vertical direction Dv is set as the fiber direction.

The core material 300 is a well-known core material such as a balsa material or a foamed resin material. The core material 300 improves bending rigidity against a load in a direction orthogonal to the outer surface. Therefore, when used for the front wall portion 4, the core material 300 of the present embodiment improves bending rigidity with respect to the front-rear direction Da. Further, when used for the ceiling wall portion 5 which will be described later, the core material 300 improves the bending rigidity with respect to the vertical direction Dv. Further, if used for the sidewall portion 6 which will be described later, the core material 300 improves the bending rigidity with respect to the width direction Dw. Like the biaxial fiber-reinforced plastic material 200, the core material 300 of the present embodiment is a foaming resin material having high incombustibility and does not burn readily.

The first laminate material 400 is constituted by sandwiching the core material 300 with a sheet-like biaxial fiber-reinforced plastic material 200. The first laminate material 400 has a frame shape.

The upper edge portion 40 is formed by sandwiching and laminating the biaxial fiber-reinforced plastic material 200 to seal the first laminate material 400. The biaxial fiber-reinforced plastic material 200 is in the form of a sheet having a thickness different from that of the biaxial fiber-reinforced plastic material 200 constituting the first laminate material 400. Specifically, the upper edge portion 40 of the present embodiment has an inner upper edge region 40a facing the opening portion 4a, and an outer upper edge region 40b outside the inner upper edge region 40a.

The inner upper edge region 40a is a region that directly faces the opening portion 4a at the upper edge portion 40. The inner upper edge region 40a is formed by laminating the two biaxial fiber-reinforced plastic materials 200. In other words, the inner upper edge region 40a is formed only by the biaxial fiber-reinforced plastic material 200. Further, since FIGS. 1 and 2 are schematic diagrams showing the outline of the front end body structure 3, the description of the inner upper edge region 40a will be omitted.

The outer upper edge region 40b is continuous with the inner upper edge region 40a as shown in FIG. 3. The outer upper edge region 40b is located above the inner upper edge region 40a. In the outer upper edge region 40b, the biaxial fiber-reinforced plastic material 200 and the first laminate material 400 are laminated in the order of the biaxial fiber-reinforced plastic material 200, the first laminate material 400, and the biaxial fiber-reinforced plastic material 200. That is, in the outer upper edge region 40b, the core material 300 is doubly sandwiched by the biaxial fiber-reinforced plastic material 200. In the outer upper edge region 40b, the combined thickness of the biaxial fiber-reinforced plastic material 200 sandwiching the first laminate material 400 and the biaxial fiber-reinforced plastic material 200 in the first laminate material 400 is formed to be thinner than the thickness of the core material 300. For example, in the outer upper edge region 40b of the present embodiment, a thickness ratio between the biaxial fiber-reinforced plastic material 200, the core material 300 and the biaxial fiber-reinforced plastic material 200 is 1:6:1.

Figure 4:
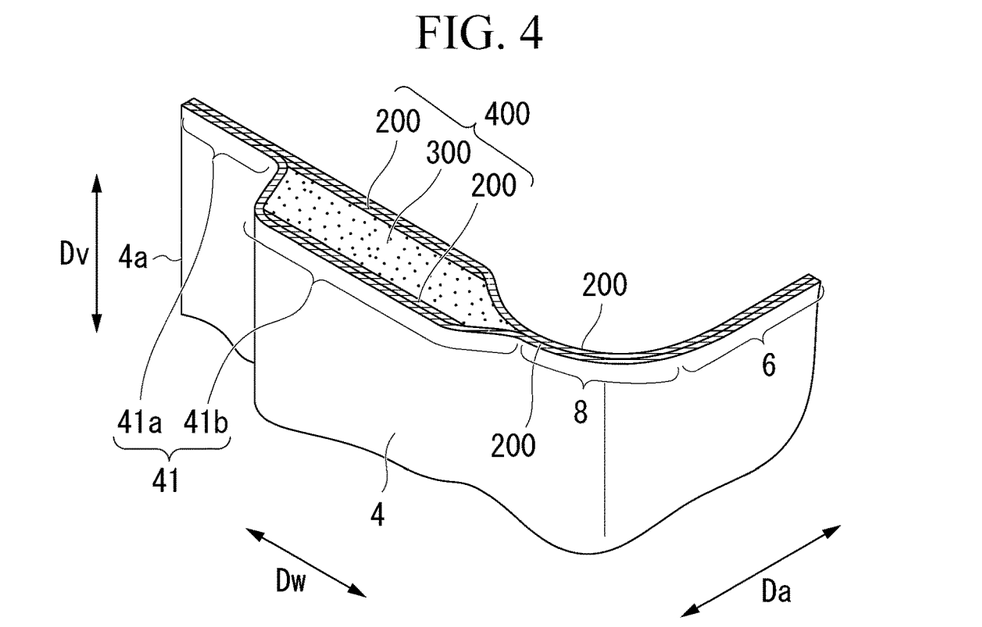
FIG. 4 is a perspective view showing a cross section of a first side edge portion and a sidewall portion in an embodiment according to the present invention, taken along a line IV-IV in FIG. 1.

As shown in FIGS. 1 and 2, the first side edge portion 41 is located on one side in the width direction Dw with respect to the opening portion 4a. One side in the width direction Dw in the present embodiment is a right side (the right side in FIGS. 1 and 2) when the front end body structure 3 is viewed from the front side. The first side edge portion 41 extends in the vertical direction Dv on the right side of the opening portion 4a in the front wall portion 4. The first side edge portion 41 is continuous with the upper edge portion 40 and is integrally formed. As shown in FIG. 4, the first side edge portion 41 has a biaxial fiber-reinforced plastic material 200 as a multi-axial fiber-reinforced plastic material. The first side edge portion 41 of the present embodiment has a first laminate material 400.

The first side edge portion 41 is formed by sandwiching and laminating the sheet-like biaxial fiber-reinforced plastic material 200 to seal the first laminate material 400. Specifically, the first side edge portion 41 of the present embodiment has an inner first side edge region 41a facing the opening portion 4a, and an outer first side edge region 41b outside the inner first side edge region 41a.

The inner first side edge region 41a is a region which directly faces the opening portion 4a in the first side edge portion 41. The inner first side edge region 41a is formed by laminating the two biaxial fiber-reinforced plastic materials 200. That is, similarly to the inner upper edge region 40a, the inner first side edge region 41a is formed only by the biaxial fiber-reinforced plastic materials 200. The inner first side edge region 41a is continuous with the inner upper edge region 40a. Further, since FIGS. 1 and 2 are schematic diagrams showing the outline of the front end body structure 3, the description of the inner first side edge region 41a will be omitted.

The outer first side edge region 41b is continuous with the inner first side edge region 41a as shown in FIG. 4. The outer first side edge region 41b is located on the right side of the inner first side edge region 41a. In the outer first side edge region 41b, the biaxial fiber-reinforced plastic material 200 and the first laminate material 400 are laminated in order of the biaxial fiber-reinforced plastic material 200, the first laminate material 400 and the biaxial fiber-reinforced plastic material 200. That is, in the outer first side edge region 41b, similarly to the outer upper edge region 40b, the core material 300 is doubly sandwiched by the biaxial fiber-reinforced plastic materials 200. The outer first side edge region 41b is continuous with the outer upper edge region 40b. In the outer first side edge region 41b, the combined thickness of the biaxial fiber-reinforced plastic materials 200 sandwiching the first laminate material 400 and the biaxial fiber-reinforced plastic material 200 in the first laminate material 400 is formed to be thinner than the thickness of the core material 300. In the outer first side edge region 41b of the present embodiment, the thickness of the core material 300 is formed to be thicker than the outer upper edge region 40b. For example, in the outer first side edge region 41b, the thickness ratio of the biaxial fiber-reinforced plastic material 200, the core material 300 and the biaxial fiber-reinforced plastic material 200 is 1:8:1.

As shown in FIGS. 1 and 2, the second side edge portion 42 is located on the other side in the width direction Dw with respect to the opening portion 4a. The other side in the width direction Dw in this embodiment is a left side (a left side in FIGS. 1 and 2) when the front end body structure 3 is viewed from the front side. The second side edge portion 42 extends in the vertical direction Dv on the left side of the opening portion 4a in the front wall portion 4. The second side edge portion 42 is continuous with the upper edge portion 40 and is integrally formed. The second side edge portion 42 of the present embodiment has a shape which is substantially symmetrical with the first side edge portion 41 with respect to the opening portion 4a. That is, the second side edge portion 42 has a cross-sectional shape symmetrical with the first side edge portion 41. Like the first side edge portion 41, the second side edge portion 42 has the biaxial fiber-reinforced plastic material 200 as a multi-axial fiber-reinforced plastic material. The second side edge portion 42 of the present embodiment has a first laminate material 400. Specifically, the second side edge portion 42 has an inner second side edge region having the same shape as the inner first side edge region 41a, and an outer second side edge region 42b having the same shape as the outer first side edge region 41b.

Figure 5:
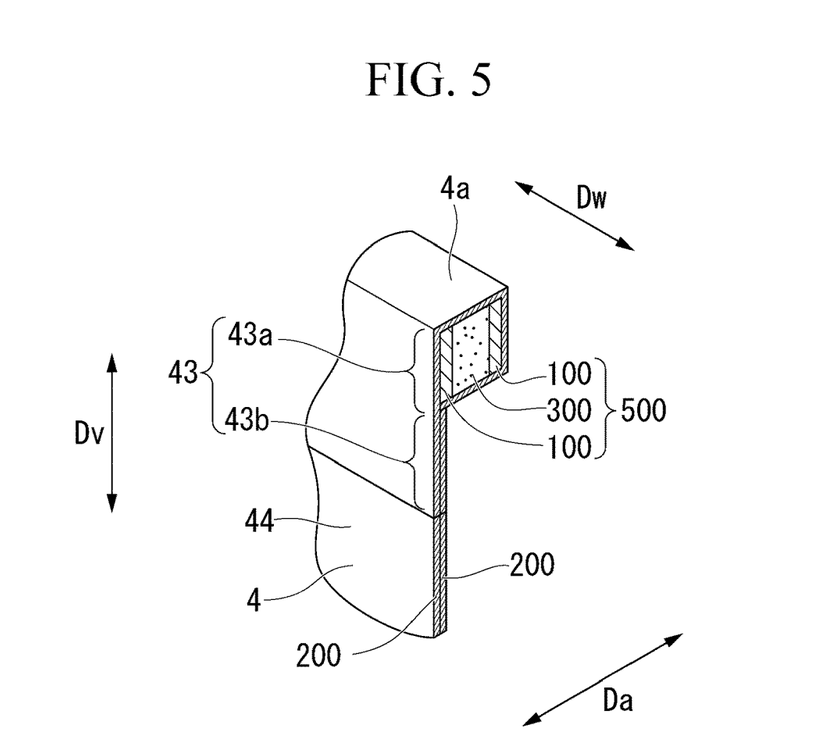
FIG. 5 is a perspective view showing a cross section of a lower edge portion and a window lower panel portion in the embodiment according to the present invention, taken along a line V-V in FIG. 1.

The lower edge portion 43 is located on the lower side in the vertical direction Dv with respect to the opening portion 4a. The lower edge portion 43 extends in the width direction Dw on the lower side of the opening portion 4a in the front wall portion 4. The lower edge portion 43 is continuous with and integrally formed with the first side edge portion 41 or the second side edge portion 42. As shown in FIG. 5, the lower edge portion 43 has a uniaxial fiber-reinforced plastic material 100 in which one direction along the outer surface is set as a fiber direction. Further, the one direction along the outer surface in the present embodiment is a direction including a component in the width direction Dw along the outer surface. The lower edge portion 43 of this embodiment has a core material 300 sandwiched between the uniaxial fiber-reinforced plastic materials 100. Here, the core material 300 in the lower edge portion 43 and the uniaxial fiber-reinforced plastic materials 100 sandwiching the core material 300 are collectively referred to as the second laminate material 500. The lower edge portion 43 has a uniaxial fiber-reinforced plastic material 100 sandwiched between the multi-axial fiber-reinforced plastic materials. Specifically, the lower edge portion 43 has a second laminate material 500 sandwiched between the biaxial fiber-reinforced plastic materials 200.

The uniaxial fiber-reinforced plastic material 100 of the present embodiment is in the form of a sheet. The second laminate material 500 is formed by sandwiching the core material 300 with the two uniaxial fiber-reinforced plastic materials 100. The core material 300 of the second laminate material 500 of this embodiment is the same material as the core material 300 of the first laminate material 400. The second laminate material 500 has a beam shape extending in the width direction Dw due to the uniaxial fiber-reinforced plastic material 100 having the same width and the core material 300.

The core material 300 of the second laminate material 500 and the core material 300 of the first laminate material 400 are not limited to being made of the same material and may be made of different materials.

The lower edge portion 43 is formed by sandwiching and laminating the sheet-like biaxial fiber-reinforced plastic material 200 to seal the second laminate material 500. Specifically, the lower edge portion 43 of the present embodiment has an inner lower edge region 43a facing the opening portion 4a, and an outer lower edge region 43b outside the inner lower edge region 43a.

The inner lower edge region 43a is a region which directly faces the opening portion 4a at the lower edge portion 43. The inner lower edge region 43a is continuous with the inner first side edge region 41a and the inner second edge region. In the inner lower edge region 43a, the biaxial fiber-reinforced plastic material 200 and the second laminate material 500 are laminated in order of the biaxial fiber-reinforced plastic material 200, the second laminate material 500, and the biaxial fiber-reinforced plastic material 200. That is, in the inner lower edge region 43a, the core material 300 is sandwiched between the two uniaxial fiber-reinforced plastic materials 100 and the two biaxial fiber-reinforced plastic materials 200. In the inner lower edge region 43a, the combined thickness of the biaxial fiber-reinforced plastic material 200 sandwiching the second laminate material 500 and the uniaxial fiber-reinforced plastic material 100 in the second laminate material 500 is formed to be thinner than the thickness of the core material 300. For example, in the inner lower edge region 43a of the present embodiment, the thickness ratio of the biaxial fiber-reinforced plastic material 200, the uniaxial fiber-reinforced plastic material 100, the core material 300, the uniaxial fiber-reinforced plastic material 100, and the biaxial fiber-reinforced plastic material 200 is 1:8:20:8:1.

The outer lower edge region 43b is continuous with the inner lower edge region 43a. The outer lower edge region 43b is located below the inner lower edge region 43a. The outer lower edge region 43b is formed by laminating the two biaxial fiber-reinforced plastic materials 200. That is, the outer lower edge region 43b is formed only by the biaxial fiber-reinforced plastic material 200, like the inner upper edge region 40a. The outer lower first side edge region 43b is continuous with the outer first side edge region 41b or the outer second side edge region 42b.

Further, as shown in FIG. 2, the front wall portion 4 has a window lower panel portion 44. The window lower panel portion 44 is located on the lower side in the vertical direction Dv with respect to the opening portion 4a. The window lower panel portion 44 is provided below the lower edge portion 43. The window lower panel portion 44 is formed integrally with the lower edge portion 43. Both sides of the window lower panel portion 44 in the width direction Dw are integrally formed with the first side edge portion 41 and the second side edge portion 42, respectively. The window lower panel portion 44 is formed in a plate shape with a resin material by spray-up molding or hand lay-up molding.

The window lower panel portion 44 may be formed integrally with the lower edge portion 43, the first side edge portion 41 or the second side edge portion 42 with the biaxial fiber-reinforced plastic material 200. The window lower panel portion 44 may be molded as a separate member and may be joined or adhered to the lower edge portion 43, the first side edge portion 41 or the second side edge portion 42.

As shown in FIG. 1, the ceiling wall portion 5 forms a ceiling surface 5a which is an outer surface facing the upper side of the vehicle 1 in the vertical direction Dv. The ceiling wall portion 5 is continuous with the front wall portion 4. The ceiling surface 5a spreads in the width direction Dw and the front-rear direction Da. The ceiling wall portion 5 in this embodiment is a region that is visible when the front end body structure 3 is viewed from the upper side in the vertical direction Dv. As shown in FIG. 2, in the ceiling wall portion 5, at least a partial region including a central portion in the width direction Dw has a core material 300 sandwiched between the multi-axial fiber-reinforced plastic materials. In the ceiling wall portion 5 of the present embodiment, the core material 300 is disposed in a ceiling region 51 which is a predetermined region including a central portion in the width direction Dw and a central portion in the front-rear direction Da. As shown in FIG. 3, the ceiling region 51 is formed by sandwiching and laminating the sheet-like biaxial fiber-reinforced plastic materials 200 to seal the core material 300. In the ceiling region 51, the biaxial fiber-reinforced plastic material 200 and the core material 300 are laminated in the order of the biaxial fiber-reinforced plastic material 200, the core material 300, and the biaxial fiber-reinforced plastic material 200. In the ceiling region 51, the thickness of the biaxial fiber-reinforced plastic material 200 sandwiching the core material 300 is formed to be thinner than the thickness of the core material 300. For example, in the ceiling region 51 of the present embodiment, the thickness ratio of the biaxial fiber-reinforced plastic material 200, the core material 300, and the biaxial fiber-reinforced plastic material 200 is 1:8:1.

As shown in FIGS. 1 and 2, the sidewall portion 6 constitutes a side surface which is an outer surface facing the outer side of the vehicle 1 in the width direction Dw. The sidewall portion 6 is provided on both sides in the width direction Dw. The sidewall portion 6 in this embodiment is a region that is visible when the front end body structure 3 is viewed from the width direction Dw. The sidewall portion 6 is continuous with the front wall portion 4 and the ceiling wall portion 5. The sidewall portion 6 extends in the vertical direction Dv and the front-rear direction Da. As shown in FIG. 4, the sidewall portion 6 is formed by laminating the two biaxial fiber-reinforced plastic materials 200. That is, the sidewall portion 6 of the present embodiment is formed only by the biaxial fiber-reinforced plastic material 200.

Further, a curved surface is formed in a connecting portion which connects the regions facing different directions, such as a portion in which the front wall portion 4 and the ceiling wall portion 5 are connected, or a portion in which the front wall portion 4 and the sidewall portion 6 are connected. The core material 300 is not disposed in such a curved portion.

More specifically, as shown in FIGS. 2 and 3, a ceiling side transition region 7, which is a portion in which the front wall portion 4 and the ceiling wall portion 5 are connected, is a region which connects the outer upper edge region 40*b* and the ceiling region 51. The ceiling side transition region 7 is disposed at a position sandwiched between the outer upper edge region 40*b* having the core material 300 and the ceiling region 51. The ceiling side transition region 7 is curved to form a convex shape toward the outside. The ceiling side transition region 7 is formed by laminating the two biaxial fiber-reinforced plastic materials 200. That is, the ceiling side transition region 7 of the present embodiment is formed only by the biaxial fiber-reinforced plastic material 200.

As shown in FIGS. 2 and 4, a sidewall side transition region 8, which is a portion in which the front wall portion 4 and the sidewall portion 6 are connected, is continuous with the outer first side edge region 41*b* having the core material 300 and the outer second side edge region 42*b*, respectively. The sidewall side transition region 8 is continuous with the ceiling side transition region 7. The sidewall side transition region 8 is formed by laminating the two biaxial fiber-reinforced plastic materials 200. That is, the sidewall side transition region 8 of the present embodiment is formed only by the biaxial fiber-reinforced plastic material 200.

According to the front end body structure 3 as described above, the upper edge portion 40, the first side edge portion 41, and the second side edge portion 42 have the biaxial fiber-reinforced plastic material 200. Therefore, in a state in which the specific strength against the load in the width direction Dw and the vertical direction Dv, which are the directions along the outer surfaces of the first side edge portion 41, the second side edge portion 42, and the upper edge portion 40 is high, the biaxial fiber-reinforced plastic materials 200 are arranged. As a result, it is possible to form the front wall portion 4 using the biaxial fiber-reinforced plastic material 200, as a frame structure in which the rigidity against the load in the vertical direction Dv and the width direction Dw is improved. As a result, it is possible to ensure the rigidity against the shear stress in which the front end body structure 3 is deformed from a rectangular shape to a parallelogram as seen from the front side by the cross wind blowing in the width direction Dw, on the front wall portion 4 by the biaxial fiber-reinforced plastic material 200.

Furthermore, since the ceiling region 51 has the first laminate material 400, the bending rigidity of the ceiling wall portion 5 against the load in the vertical direction Dv can be improved by the core material 300. The front end body structure 3 receives such a stress by which the ceiling wall portion 5 deforms to bulge upward, by the upper negative pressure caused by running wind blowing from the front side as the vehicle 1 runs. However, in the front end body structure 3 according to the present embodiment, the bending rigidity against the stress can be secured on the ceiling wall portion 5 by the core material 300. In particular, when the ceiling surface is flat like the ceiling region 51 of the present embodiment, it is possible to effectively secure the bending rigidity against a stress that deforms to bulge upward, by the core material 300.

Therefore, the rigidity against load in different directions can be improved by the upper edge portion 40, the first side edge portion 41, the second side edge portion 42, and the ceiling wall portion 5. In other words, the front end body structure 3 can be formed by separating the function of increasing the rigidity into the front wall portion 4 and the ceiling wall portion 5. As a result, it is possible to secure the necessary strength of the front end body structure 3, without thickening the cross-sectional shape using a large amount of fiber-reinforced plastics, as in the case of forming the front end body structure 3 simply using the fiber-reinforced plastic (FRP). That is, while using a plastic material, it is possible to ensure the strength against a load from a plurality of directions such as the width direction Dw and the vertical direction Dv.

In addition, each region is formed by laminating the sheet-like biaxial fiber-reinforced plastic material 200 and the uniaxial fiber-reinforced plastic material 100. Therefore, it is possible to easily mold the front end body structure 3 with an arbitrary thickness or curvature. Therefore, it is possible to ensure strength, while setting the front end body structure 3 to a required shape.

In a region in which a curved surface is formed as in the ceiling side transition region 7, a hoop stress due to the curved surface is generated. Therefore, it is possible to ensure the rigidity against the load in the vertical direction Dv only with the biaxial fiber-reinforced plastic material 200, without using the core material 300 like the ceiling region 51. Therefore, it is possible to reduce the use amount of the core material 300 and to manufacture the front end body structure 3 with a reduced cost.

In addition, the outer upper edge region 40*b*, the outer first side edge region 41*b*, and the outer second side edge region 42b have the first laminate material 400. Therefore, the bending rigidity of each of the first side edge portion 41, the second side edge portion 42, and the upper edge portion 40 against the load from the front side to the rear side due to the running wind can be improved by the core material 300, as compared with the case of only the biaxial fiber-reinforced plastic material 200.

The uniaxial fiber-reinforced plastic material 100 having high resistance to the width direction Dw is disposed in the inner lower edge region 43a. Therefore, it is possible to improve the rigidity of the front wall portion 4 against the load from the front side to the rear side due to the running wind, by the lower edge portion 43.

In particular, in the present embodiment, the second laminate material 500 is disposed in the inner lower edge region 43a. Therefore, compared with the case of only the uniaxial fiber-reinforced plastic material 100, the bending rigidity of the lower edge portion 43 against the load from the front side to the rear side due to the running wind can be improved by the core material 300.

Further, in the present embodiment, the second laminate material 500 is sandwiched between the biaxial fiber-reinforced plastic materials 200 in the inner lower edge region 43a. When using the biaxial fiber-reinforced plastic material 200, it is also possible to improve the rigidity of the front wall portion 4 against the shear stress due to the cross wind, at the lower edge portion 43.

According to the vehicle 1 having the front end body structure 3 as described above, while securing the strength, it is possible to reduce the weight while suppressing the cost of the vehicle 1, as compared with the case where the vehicle 1 is formed of a metal material.

Although the embodiments of the present invention have been described above in detail with reference to the drawings, the respective configurations and combinations thereof in the respective embodiments are merely examples, and additions, omissions, substitutions and other changes of configurations can be made within the scope that does not depart from the gist of the present invention. Further, the present invention is not limited by the embodiments, and is limited only by the claims.

For example, as a modified example of the present embodiment, the sidewall side transition region 8 and the ceiling side transition region 7 may have the core material 300. Specifically, similarly to the ceiling region 51 and the upper edge portion 40, the sidewall side transition region 8 and the ceiling side transition region 7 of the modified example may be formed by being sandwiched and laminated such that the sheet-like biaxial fiber-reinforced plastic material 200 seals the core material 300. At this time, in the sidewall side transition region 8 and the ceiling side transition region 7, it is preferable that the thickness of the biaxial fiber-reinforced plastic material 200 sandwiching the core material 300 be formed to be thinner than the thickness of the core material 300. With such a configuration, the bending rigidity is improved, and the strength of the front end body structure 3 can be further improved.

Further, in the ceiling wall portion 5 of the present embodiment, the core material 300 is provided only in the ceiling region 51, but the present invention is not limited to such a configuration. At least a partial region of the ceiling wall portion 5 including the central portion in the width direction Dw may have the core material 300, and the entire region of the ceiling wall portion 5 may have the core material 300.

Further, although the sidewall portion 6 of the present embodiment is formed only by the biaxial fiber-reinforced plastic material 200, it is not limited to such a configuration. For example, the sidewall portion 6 may have the core material 300 in the entire region or a partial region.

Further, the lower edge portion 43 of the present embodiment has the second laminate material 500 sandwiched between the biaxial fiber-reinforced plastic materials 200, but the present invention is not limited to such a configuration. For example, the lower edge portion 43 may be configured to have only the second laminate material 500 or may be configured to have only the uniaxial fiber-reinforced plastic material 100, as long as necessary rigidity can be secured. With such a configuration, it is possible to further reduce the weight of the lower edge portion 43.

Further, instead of using a plastic material like the uniaxial fiber-reinforced plastic material 100, the lower edge portion 43 may have a metallic material. Since only the lower edge portion 43 is made of a metal material, it is possible to easily form a structure for attaching components such as wipers and lights. This makes it possible to simplify the structure on the lower side of the opening portion 4a, which requires the attachment of the most components of the front wall portion 4, as compared with the case of using a plastic material.

Further, in the present embodiment, the upper edge portion 40, the first side edge portion 41, and the second side edge portion 42 have the core material 300, but the present invention is not limited to such a structure. At least one of the side edge portion and the upper edge portion among the edge portions may have the core material 300. Therefore, only the upper edge portion 40 may have the core material 300, and only the first side edge portion 41 and the second side edge portion 42 may have the core material 300.

Furthermore, in this embodiment, the biaxial fiber-reinforced plastic material 200 is used as the multi-axial fiber-reinforced plastic material, but the present invention is not limited thereto. The multi-axial fiber-reinforced plastic material may have three or more directions as the fiber direction as long as it is a fiber-reinforced plastic material in which at least two directions intersecting along the outer surface are set as the fiber direction.

Furthermore, the multi-axial fiber-reinforced plastic material is not limited to one having two directions orthogonal to the outer surface as the fiber direction, like the biaxial fiber-reinforced plastic material 200 of the present embodiment. Therefore, the multi-axial fiber-reinforced plastic material may have two directions or three directions orthogonal to each other as the fiber direction, as long as the plural directions intersecting along the outer surface are the fiber direction.

Further, the vehicle 1 is not limited to the vehicle of the guideway transit system for the new transportation system, but may be a railway vehicle.

In addition, the front end body structure 3 is not limited to the structure that constitutes only the front end portion of the vehicle 1 in the front-rear direction Da as in the present embodiment, the front end body structure 3 may be a structure which forms the front end portion of the vehicle 1 in the front-rear direction Da. For example, the front end body structure 3 may form only the rear end portion which is the other side of the vehicle 1 in the front-rear direction Da, or may form the both end portions of the vehicle 1 in the front-rear direction Da.

In addition, the opening portion 4a is not limited to a rectangular opening as in this embodiment, but the opening portion 4a may be opened at the front wall portion 4. For example, the opening portion 4a may have a circular shape or an elliptical shape and be opened.

INDUSTRIAL APPLICABILITY

According to the front end body structure and the vehicle, it is possible to secure the strength against the load, while using the plastic material.

REFERENCE SIGNS LIST

1 Vehicle
Da Front-rear direction
Dw Width direction
Dv Vertical direction
2 Vehicle main body
3 Front end body structure
4 Front wall portion
4a Opening portion
40 Upper edge portion
40a Inner upper edge region
40b Outer upper edge region
41 First side edge portion
41a Inner first side edge region
41b Outer first side edge region
42 Second side edge portion
42a inner second side edge region
42b outer second side edge region
43 lower edge portion
43a inner lower edge region
43b Outer lower edge region
44 Window lower panel portion
5 Ceiling wall portion
51 Ceiling region
6 Sidewall portion
7 Ceiling side transition region
8 Sidewall side transition region
100 Uniaxial fiber-reinforced plastic material
200 Biaxial fiber-reinforced plastic material
300 Core material
400 First laminate material
500 Second laminate material

What is claimed is:

1. A front end body structure which forms an end portion in a front-rear direction of a vehicle, the front end body structure comprising:
a front wall portion which forms a front surface facing one of forward and rearward directions and has edge portions forming an opening portion opened toward the one of the forward and rearward directions; and
a roof wall portion which is continuous with the front wall portion and forms a roof surface facing upward of the vehicle in the vertical direction,
wherein, in the front wall portion, side edge portions on both sides of the vehicle in a width direction and an upper edge portion on an upper side in the vertical direction among edge portions surrounding the opening portion have a multi-axial fiber-reinforced plastic material in which at least two directions along outer surfaces of the side edge portions and the upper edge portion are set as a fiber direction,
wherein a lower edge portion of a lower side in the vertical direction among the edge portions of the opening portion has a uniaxial fiber-reinforced plastic having the width direction as the fiber direction,
inner side edge regions, which directly face the opening portion in the side edge portions, are formed only by two parts of the multi-axial fiber-reinforced plastic material, and
an inner upper edge region, which directly faces the opening portion in the upper edge portion, is formed only by the multi-axial fiber-reinforced plastic material.

2. The front end body structure according to claim 1, wherein the front wall portion has a multi-axial fiber-reinforced plastic material in which at least two directions obliquely intersecting each other in the width direction and the vertical direction are set as the fiber direction.

3. The front end body structure according to claim 1, wherein a connecting portion which connects the front wall portion and the roof wall portion is formed only by the multi-axial fiber-reinforced plastic material.

4. The front end body structure according to claim 2, wherein a connecting portion which connects the front wall portion and the roof wall portion is formed only by the multi-axial fiber-reinforced plastic material.

5. The front end body structure according to claim 1, wherein at least one of the side edge portion and the upper edge portion includes a core material sandwiched between two parts of the multi-axial fiber-reinforced plastic material.

6. The front end body structure according to claim 2, wherein at least one of the side edge portion and the upper edge portion includes a core material sandwiched between two parts of the multi-axial fiber-reinforced plastic material.

7. The front end body structure according to claim 3, wherein at least one of the side edge portion and the upper edge portion includes a core material sandwiched between two parts of the multi-axial fiber-reinforced plastic material.

8. The front end body structure according to claim 4, wherein at least one of the side edge portion and the upper edge portion includes a core material sandwiched between two parts of the multi-axial fiber-reinforced plastic material.

9. The front end body structure according to claim 1, wherein the lower edge portion has a core material sandwiched between two parts of the uniaxial fiber-reinforced plastic.

10. The front end body structure according to claim 9, wherein the lower edge portion has the uniaxial fiber-reinforced plastic sandwiched between two parts of the multi-axial fiber-reinforced plastic material.

11. The front end body structure according to claim 1, wherein at least a partial region of the ceiling wall portion including a center portion in the width direction has a core material sandwiched between two parts of the multi-axial fiber-reinforced plastic material.

12. A vehicle comprising:
the front end body structure according to claim 1; and
a vehicle main body fixed to the front end body structure.

13. The front end body structure according to claim 10, wherein an inner lower edge region, which directly faces the opening portion in the lower edge portion, has a core material sandwiched between the two parts of the uniaxial fiber-reinforced plastic, the two parts of the uniaxial fiber-reinforced plastic being sandwiched between the two parts of the multi-axial fiber-reinforced material.

14. A front end body structure which forms an end portion in a front-rear direction of a vehicle, the front end body structure comprising:
a front wall portion which forms a front surface facing one of forward and rearward directions and has edge portions forming an opening portion opened toward the one of the forward and rearward directions; and
a roof wall portion which is continuous with the front wall portion and forms a roof surface facing upward of the vehicle in the vertical direction,
wherein, in the front wall portion, side edge portions on both sides of the vehicle in a width direction and an upper edge portion on an upper side in a vertical direction among edge portions surrounding the opening portion have a multi-axial fiber-reinforced plastic material in which at least two directions along outer surfaces of the side edge portions and the upper edge portion are set as a fiber direction, the two directions are inclined at 45° with respect to each of the width direction and the vertical direction, and are orthogonal to each other, inner side edge regions, which directly face the opening portion in the side edge portions, are formed only by two parts of the multi-axial fiber-reinforced plastic material, and an inner upper edge region, which directly faces the opening portion in the upper edge portion, is formed only by the multi-axial fiber-reinforced plastic material.

\* \* \* \* \*